United States Patent
Schuette

(10) Patent No.: US 8,463,979 B2
(45) Date of Patent: Jun. 11, 2013

(54) NON-VOLATILE STORAGE DEVICES, METHODS OF ADDRESSING, AND CONTROL LOGIC THEREFOR

(75) Inventor: Franz Michael Schuette, Colorado Springs, CO (US)

(73) Assignee: OCZ Technology Group Inc., San Jose, CA (US)

(\*) Notice: Subject to any disclaimer, the term of this patent is extended or adjusted under 35 U.S.C. 154(b) by 0 days.

(21) Appl. No.: 13/181,589

(22) Filed: Jul. 13, 2011

(65) Prior Publication Data

US 2011/0283043 A1    Nov. 17, 2011

Related U.S. Application Data

(63) Continuation-in-part of application No. 12/876,937, filed on Sep. 7, 2010.

(60) Provisional application No. 61/240,338, filed on Sep. 8, 2009.

(51) Int. Cl.
    *G06F 12/06* (2006.01)
(52) U.S. Cl.
    USPC .......................... 711/5; 711/103; 711/E12.08
(58) Field of Classification Search
    USPC .................................. 711/103, 114
    See application file for complete search history.

(56) References Cited

U.S. PATENT DOCUMENTS

| | | | |
|---|---|---|---|
| 5,313,613 A * | 5/1994 | Gregor | 711/128 |
| 6,195,733 B1 * | 2/2001 | Nair et al. | 711/202 |
| 7,873,777 B2 * | 1/2011 | Kang | 711/103 |
| 2005/0268022 A1 * | 12/2005 | Pelley | 711/5 |
| 2007/0288688 A1 * | 12/2007 | Kang | 711/103 |
| 2009/0172335 A1 * | 7/2009 | Kulkarni et al. | 711/170 |
| 2009/0240876 A1 * | 9/2009 | Okuno et al. | 711/110 |
| 2012/0184367 A1 * | 7/2012 | Parrott et al. | 463/31 |

\* cited by examiner

*Primary Examiner* — Edward Dudek, Jr.
*Assistant Examiner* — Sean D Rossiter
(74) *Attorney, Agent, or Firm* — Hartman Global IP Law; Gary M. Hartman; Domenica N. S. Hartman

(57) ABSTRACT

Non-volatile storage devices and methods capable of achieving large capacity solid state drives containing multiple banks of memory devices. The storage devices include a printed circuit board, at least two banks of non-volatile solid-state memory devices, bank switching circuitry, a connector, and a memory controller. The bank switching circuitry is integrated onto the memory controller and functionally interposed between the banks of memory devices and the front end of the memory controller. The bank switching circuitry operates to switch accesses by the memory controller among the at least two banks.

16 Claims, 5 Drawing Sheets

NON-VOLATILE STORAGE DEVICES, METHODS OF ADDRESSING, AND CONTROL LOGIC THEREFOR

CROSS REFERENCE TO RELATED APPLICATIONS

This application is a continuation in part of U.S. patent application Ser. No. 12/876,937, which claims the benefit of U.S. Provisional Application No. 61/240,338, filed Sep. 8, 2009. The contents of these applications are incorporated herein by reference.

BACKGROUND OF THE INVENTION

The present invention generally relates to memory devices for use with computers and other processing apparatuses. More particularly, this invention relates to high capacity non-volatile or permanent memory-based mass storage devices of the type known as solid state drives (SSD).

Mass storage devices such as advanced technology (ATA) or small computer system interface (SCSI) drives are rapidly adopting non-volatile memory technology such as flash memory or other emerging solid state memory technology, including phase change memory (PCM), resistive random access memory (RRAM), magnetoresistive random access memory (MRAM), ferromagnetic random access memory (FRAM), organic memories, or nanotechnology-based storage media such as carbon nanofiber/nanotube-based substrates. Currently the most common technology uses NAND flash memory as inexpensive storage memory.

Current solid state drives are limited in their capacity by the density of the NAND chips in conjunction with the limitations of the control logic, that is, the memory controller. Even if the memory management unit is aware of a large memory space through, for example, a 48-bit large block addressing scheme, the actual controller will typically have limitations in the number of address lines or chip-enable lines, which then limits the overall capacity of the device to a much smaller size. For example, using an eight-channel interleaved flash memory controller and 32 Gbit ICs, the maximum capacity of a single unit solid state drive is currently 256 GB.

In the past, the cost of NAND flash memory was prohibitive for even considering ultra-high capacity solid state drives, but with production ramping up and NAND cost decreasing on average by 50% per year, solid state drives have not only gained acceptance in the market but are also constantly increasing in capacity. Decreasing acquisition cost in conjunction with much lower power consumption (low operational cost) results in a lower total cost of ownership (TCO). The lower TCO combined with the mechanical robustness of solid state drives have created a need for a type of solid state drive with ultra high capacity.

Current solutions to overcome the size limitations posed by limited density of NAND flash memory ICs and the limited number of chip select lines on the controller employ bundling of several solid state drives within a single package and functionally integrating them into a spanned volume or into a striped RAID array (Level 0). An example of such a solid state drive 10 is schematically represented in FIG. 1, which shows a printed circuit board 12 equipped with a power and data connector 14 and multiple memory chips 18. The connector 14 provides a system interface by which the solid state drive 10 can be connected to a cable of a host computer system (not shown). The memory chips 18 are typically flash (e.g., NAND) non-volatile memory chips or another non-volatile memory technology. FIG. 1 further represents the capacity of the solid state drive 10 as increased by effectively consolidating two separate solid state drives on the circuit board 12, represented as two separate arrays (banks) 16 of the memory chips 18, each with a dedicated control logic (controller) 20 (represented as an integrated circuit (IC) chip), and further interfaced with the computer system through a RAID controller 22, typically through a Level 0 striped configuration.

The type of configuration represented in FIG. 1 has the advantage of ease of configurability and, in most cases, allows some additional management features such as the selection of the type of array, meaning JBOD, RAID Level 0 or RAID Level 1 (striping or mirroring, respectively). On the downside, this arrangement incurs the additional cost for the RAID controller 22 as well as the second solid state drive controller 20, typically a Serial ATA (SATA) to NAND flash memory controller, with an extra volatile cache (not shown). Functionally, the RAID 0, as the most commonly used, will not be able to play out the combined transfer rates of two drives because the system interface (connector 14) is usually a single SATA link, which limits the host transfer rate and can cause some problems if the combined internal media transfer rate at the back-end of the solid state drive 10 is greater than the host transfer rate.

Another important aspect for performance of a solid state drive is the discrepancy in speed between contemporary controllers at the front end of the solid state drive and the NAND flash storage memory at the back-end of the drive. NAND flash is inherently slow because of its architecture and design limitations whereas flash controllers can be scaled up to outpace the performance of the memory components by multiples.

BRIEF DESCRIPTION OF THE INVENTION

The present invention provides non-volatile storage devices and methods capable of achieving large capacity solid state drives containing multiple banks of memory devices. In particular, the present invention provides a non-volatile storage device that utilizes a single control logic adapted to control multiple independent units of non-volatile memory devices by switching between the units to access one unit at any given time. Such units can be a composite of memory devices that can be described as a bank of devices. Switching between the banks can be achieved with a switch or other suitable device so that during a read access, data from the banks of memory devices are multiplexed into a common data transfer, and during a write access a multiplexed signal is split or de-multiplexed before being transferred to the banks of memory devices.

According to a first aspect of the invention, a non-volatile storage device is adapted for use with a host system and includes a printed circuit board, at least two banks of non-volatile solid-state memory devices on the printed circuit board, and a control logic package on the printed circuit board. The control logic package comprises an input/output interface adapted to interface with a host bus adapter of the host system, a memory controller adapted to interface with the memory devices, and bank switching circuitry functionally interposed between the memory controller and the banks of the memory devices. The bank switching circuitry operates to switch accesses by the memory controller among the banks.

According to a second aspect of the invention, a method is provided for increasing addressable memory space of a non-volatile storage device that comprises a circuit board and control logic and non-volatile solid-state memory devices on the circuit board. The method includes providing multiple channels of the memory devices that are functionally arranged to define at least two banks of the memory devices per channel on the circuit board, providing the control logic to comprise system interface logic, a memory controller and channel control units integrated in a single integrated circuit package, providing bank switching circuitry associated with each channel and integrated on the single integrated circuit package, and operating the bank switching circuitry to multiply memory space within the memory devices that is addressable by each channel by the number of the at least two banks.

Another aspect of the invention is a monolithic control logic for a solid state drive adapted to interface non-volatile memory devices with a host system. The monolithic control logic has a system interface that includes circuitry for native command queuing, an address translation layer adapted to translate virtual addresses into physical memory addresses, at least two channels for accessing the memory devices, and input/output pins adapted to interface with at least two banks of the memory devices. Each channel has a channel control unit and switching circuitry interposed between the channel control unit and the input/output pins of the monolithic control logic. The switching circuitry is operable to switch access by the channel control units from one of the banks of the memory devices to another bank of the memory devices.

From the above it can be appreciated that, according to certain aspects of the invention, a large capacity solid state drive can be provided that is capable of using a memory controller in combination with bank switching circuitry to translate a small address space into several physical address spaces, each using its own bank of memory devices. As a result, a significant advantage made possible with this invention is that the desired capacity of a solid state drive can exceed the addressing space of its memory controller. In addition, since the switching circuitry toggles between banks of memory devices, the electrical load on the control, address and data lines is at any given time that of a single bank.

Each of the capabilities described above is achieved using the bank switching circuitry to duplicate control, address and data lines and act as an intermediate buffer for memory addresses before propagating them to multiple banks of memory devices using dedicated address and data lines on a per bank basis. Moreover, the bank switching circuitry can contain data buffers to buffer reads and writes from and to the memory banks and transfer them to the controller at n times the data rate between the bank switching circuitry and the memory device wherein n equals the number of banks enabled by the switching circuitry. As a result, the invention enables at least doubling of the capacity of a solid state drive without the need of an extra controller in an internal redundant array of independent drives (RAID) Level 0 configuration and further at least doubles the overall data transfer rate between the controller and the memory devices on each channel.

Other aspects and advantages of this invention will be better appreciated from the following detailed description.

DETAILED DESCRIPTION OF THE INVENTION

Figure 1:
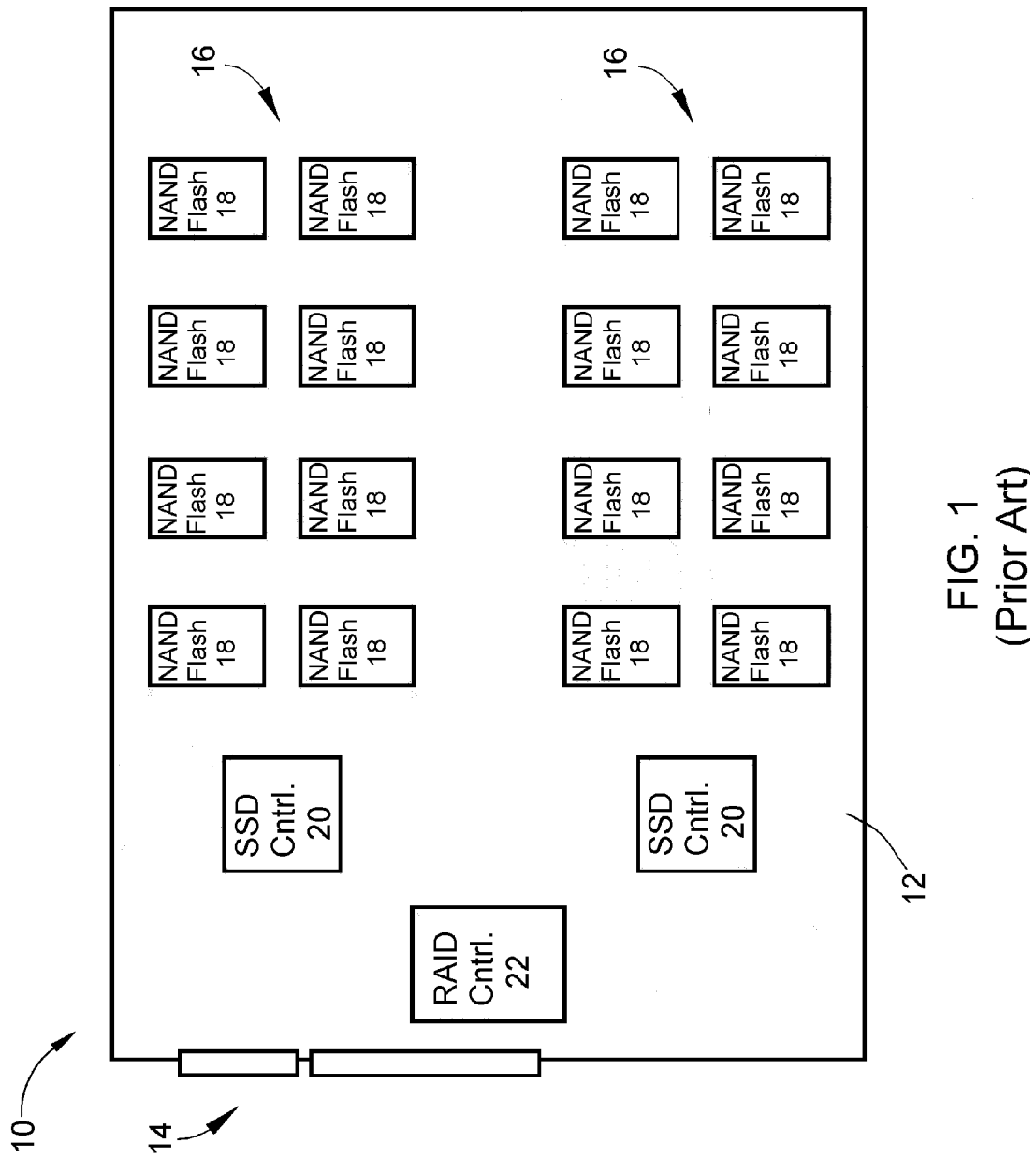
FIG. 1 schematically represents a prior art RAID Level 0 configuration using a RAID controller with two functional solid state drives integrated on a single circuit board to overcome the address limitation of a single solid state drive controller.
Figure 2:
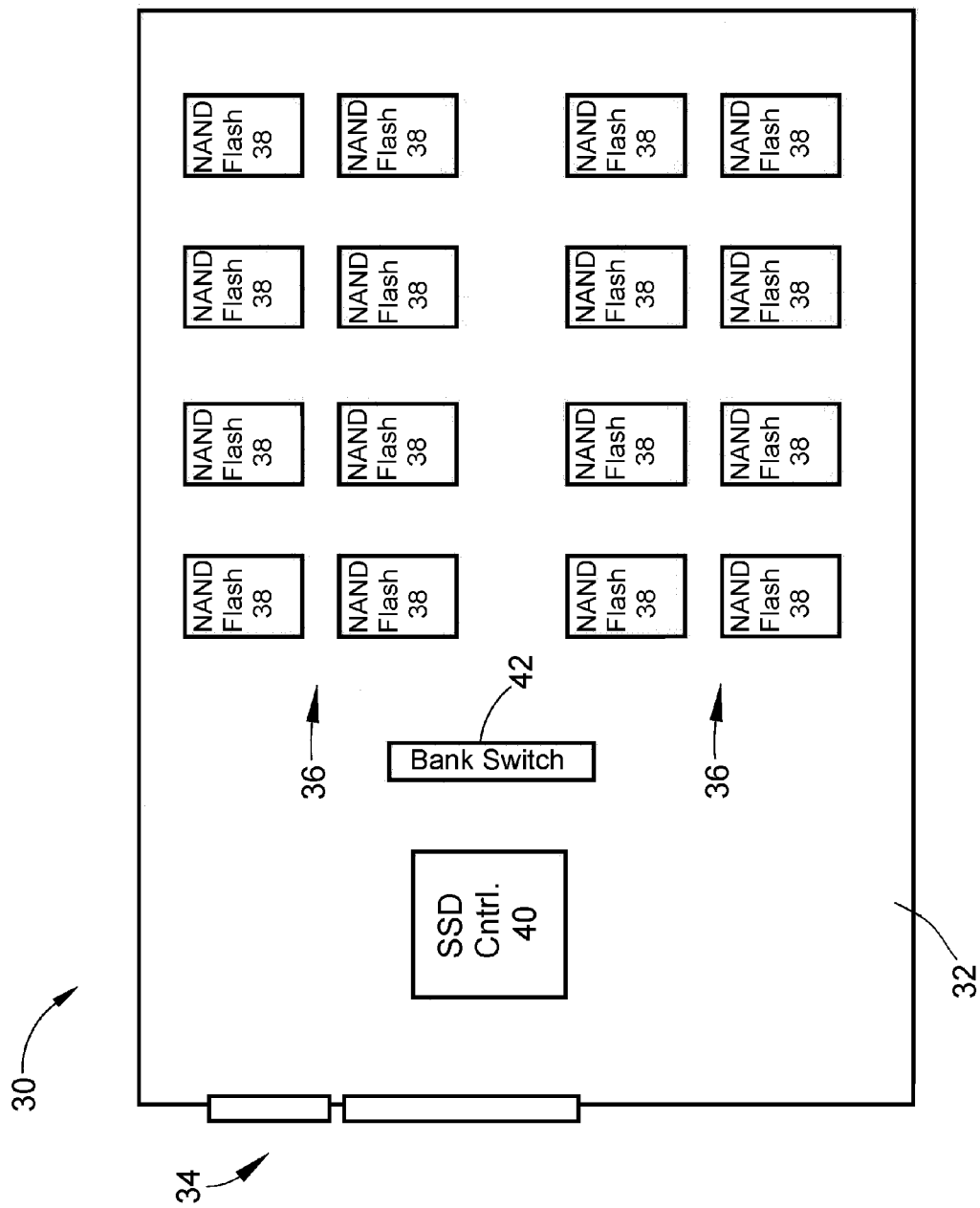
FIG. 2 schematically represents an solid state drive comprising separate array banks of memory devices, a single solid state drive controller, and an interposed bank-switch circuitry according to a first embodiment of the invention.
Figure 3:
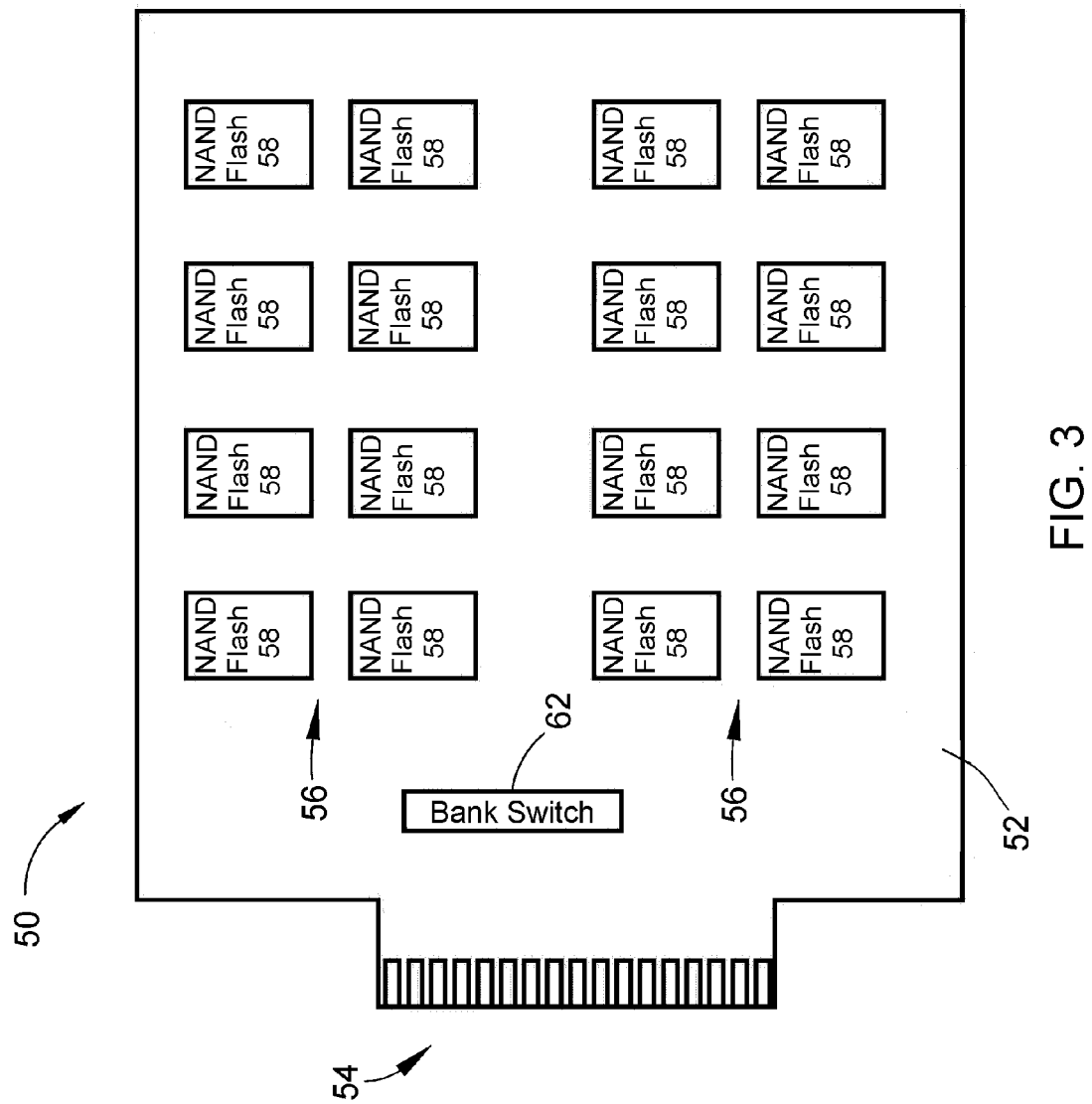
FIG. 3 schematically represents a second embodiment of the invention, in which a flash memory card comprising separate banks of memory devices is adapted to interface with the system logic of a host system through bank switching circuitry without the need for a controller on the card.
Figure 4:
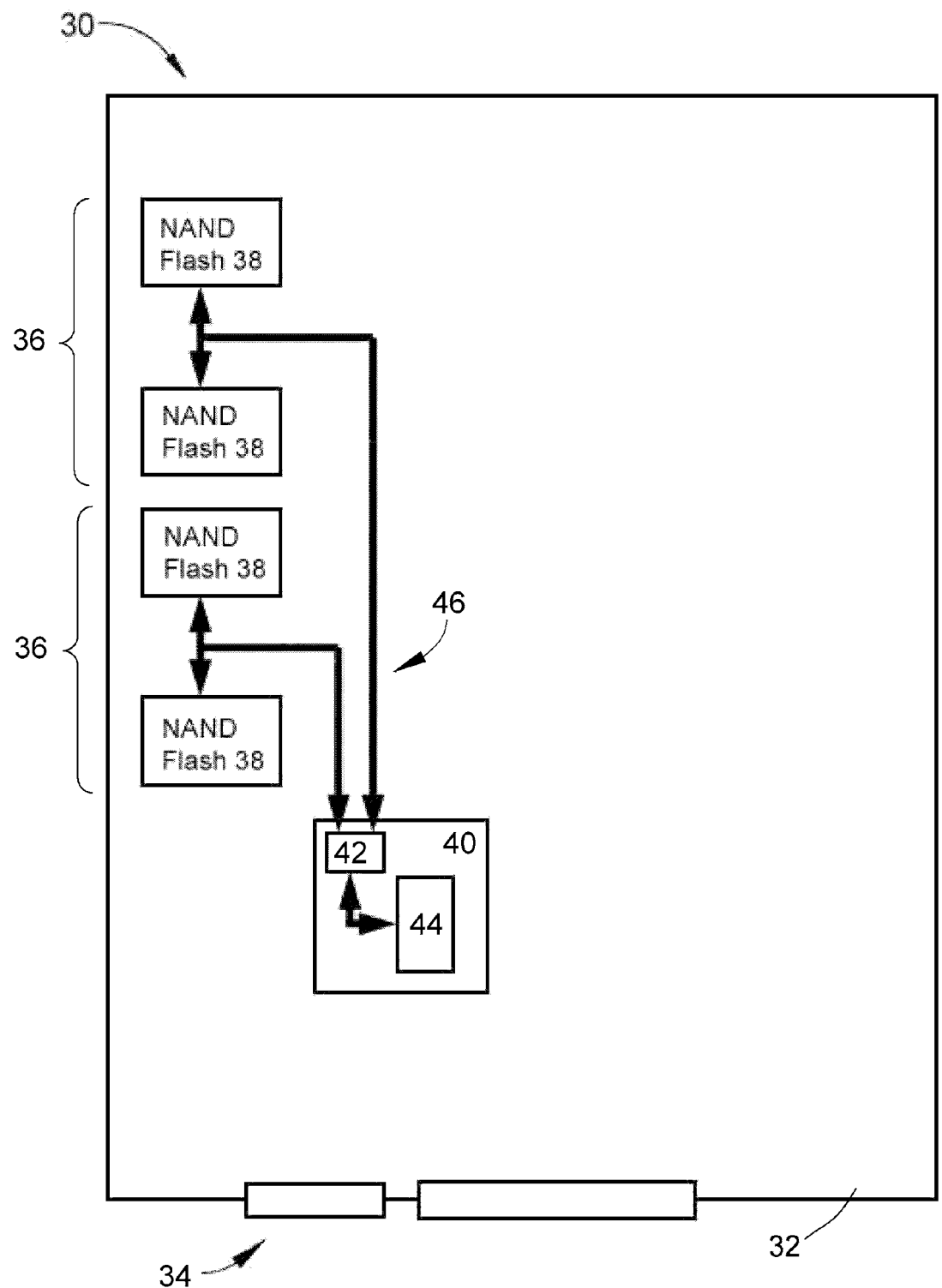
FIG. 4 schematically represents a variation of the embodiment of FIG. 2, wherein the bank switching circuitry is integrated on the solid state drive controller.

The present invention is generally applicable to computers and other processing apparatuses, and particularly to personal computers, workstations and other apparatuses that utilize nonvolatile (permanent) memory-based mass storage devices, a notable example of which are solid-state drives (SSDs) that make use of NAND flash memory devices. FIGS. 2, 3, and 4 schematically represent solid state drives configured as internal mass storage devices for a computer or other host system (not shown) equipped with a data and control bus for interfacing with the solid state drives. The bus may operate with any suitable protocol in the art, a preferred example being the serial advanced technology attachment (SATA) bus, though other protocols are also possible.

Current flash controllers used in solid state drives have typically utilized a plurality of individual, parallel channels for individual addressing of each NAND flash memory device or a logical group of NAND flash memory devices. At present, this typically includes two individual packages, each having several dies in a multichip package that are enabled via control signals such as Chip Enable (CE), Read Enable (RE), Write Enable (WE), Command Latch Enable (CLE), Address Latch Enable (ALE) and Ready/Busy (R/B#). The number of channels found in current controllers is typically eight or ten. For the purpose of this invention, however, the parallelism of channels is inconsequential since each channel is essentially a functional unit and the invention applies to each channel, regardless of how many channels are implemented and/or populated on the solid state drive. Therefore, the invention will be explained using one channel as an example for an entire solid state drive, though it should be understood that the invention can be applied to multiple channels and that each channel would benefit from the invention.

FIG. 2 shows a solid state drive 30 as comprising a printed circuit board 32 equipped with a power and data connector 34 and separate banks 36 of memory devices 38 according to one embodiment of the invention. The memory devices 38 are non-volatile memory devices, preferably NAND flash memory devices, though other types of non-volatile memory could be used, including but not limited to phase change memory (PCM), magnetic RAM, resistive memory, and FRAM. The drive 30 further comprises a single memory controller 40 whose electronics bridge the memory devices 38 to the input/output (I/O) interface of the drive 30. In a preferred embodiment, the connector 34 is a SATA interface and the controller 40 is a SATA to solid state drive (SATA-SSD) memory controller, as is well known in the art.

FIG. 2 further shows the solid state drive 30 as equipped with a bank switching circuitry (mapper) 42 interposed between the banks 36 of memory devices 38 and the controller 40. The addressing of the banks 36 is done through routing the address and data signals from the controller 40 to the bank switching circuitry 42, which then selects the desired bank 36 for access. The bank switching circuitry 42 may be a transparent latch, in other words, a change in the input signal to the circuitry 42 causes an immediate change in the output of the circuitry 42, resulting in switching between the banks 36 of memory devices 38.

Each bank 36 can contain any number of memory devices 38 up to the maximum addressable memory space of the controller 40. The individual banks 36 are electrically isolated from the controller 40, since the bank switching circuitry 42 is between the controller 40 and each bank 36 and therefore receives the primary address and data signals from the host system through the controller 40, and then generates a secondary set of address and data signals to the banks 36.

The embodiment of FIG. 2 enables the addressable memory space (domain) of the solid state drive 30 to be increased by bank-switching, which allows the controller 40 to access a larger physical memory space than it would normally be able to see. Bank switching has been used in low bandwidth applications like Read-Only addressing of NOR flash memory on the game cartridges, for example, Game-Boy® and the Nintendo Entertainment System (NES) commercially available from Nintendo Co., Ltd. In the current invention, bank switching is employed to increase the addressable memory space of the solid state drive 30 by dividing the non-volatile memory space of the drive 30 into two or more banks (arrays), thereby increasing the maximum capacity of the drive 30 beyond the limitation of its controller 40.

As known in the art, NAND flash memory devices have an initial access latency, typically on the order of about 50 to about 100 microseconds, and therefore switching latencies associated with the bank switching circuitry 42 weigh in relatively little compared to the overall response latencies of the memory banks 36. A phase lock loop can be used to synchronize clock signals, enabling the bank switching circuitry 42 to be locked into the common clock input and delay propagation of addresses by at least one clock cycle, while preserving the clock edges for easier timing management.

FIG. 3 represents another embodiment in which memory addressing is done on the system level, for example, by a flash memory controller (not shown) that can be integrated on the motherboard of the host computer or else in software using central processor unit (CPU) cycles. In this case, FIG. 3 depicts a flash memory card 50 comprising a printed circuit board 52 equipped with a connector 54 and at least two banks 56 of flash memory devices 58. The memory card 50 can be inserted into a dedicated port or slot on a motherboard (not shown). Similar to the embodiment of FIG. 2, the flash memory card 50 has a bank switching circuitry 62 integrated on the circuit board 52 to address the flash memory devices 58 in the banks 56. The bank switching circuitry 62 receives address, data and control signals from the system logic of the host system, and then splits these signals between the banks 56 of memory devices 58.

As with the embodiment of FIG. 2, the configuration represented in FIG. 3 allows expanding the addressable memory space beyond that enabled by the control logic at the system level. Other aspects of the memory card 50 and its operation, including the types of connectors 54 and memory devices 58 that can be used and the types and operation of the bank switching circuitry 62, can be as described for the embodiment of FIG. 2.

FIG. 4 shows another aspect of the invention which is similar to that shown in FIG. 2, but wherein the bank switching circuitry 42 is integrated into the memory controller 40 and interposed between a channel control unit 44 and address and data buses 46. Each bus 46 includes dedicated input/output circuitry for each bank 36 of NAND flash memory devices 38 on a per channel basis. The combined address and data buses 46 are split between the two banks 36 of memory devices 38 in order to enable the memory controller 40 to use interleaving accesses of the same memory addresses on both of the banks 36 and thereby allow for interleaving of transfers between the two banks 36. In this case, transfers would always start at the lowest bank (Bank0) with a burst of data corresponding to the optimal data set usable by its memory devices 38; for example, write one page of a NAND flash block to Bank0 and then toggle to the second bank (Bank1) to split the address and data transfers over the two banks 36 and effectively double the bandwidth. The advantage of this embodiment is ease of management in that the physical addressing of blocks is duplicated over the two banks 36, which facilitates, among other things, factors like wear leveling. On the other hand, by extension, bad-block management is also duplicated. Consequently, good blocks in one bank 36 with the same physical address as a bad block in the other bank 36 will also be retired as bad.

Figure 5:
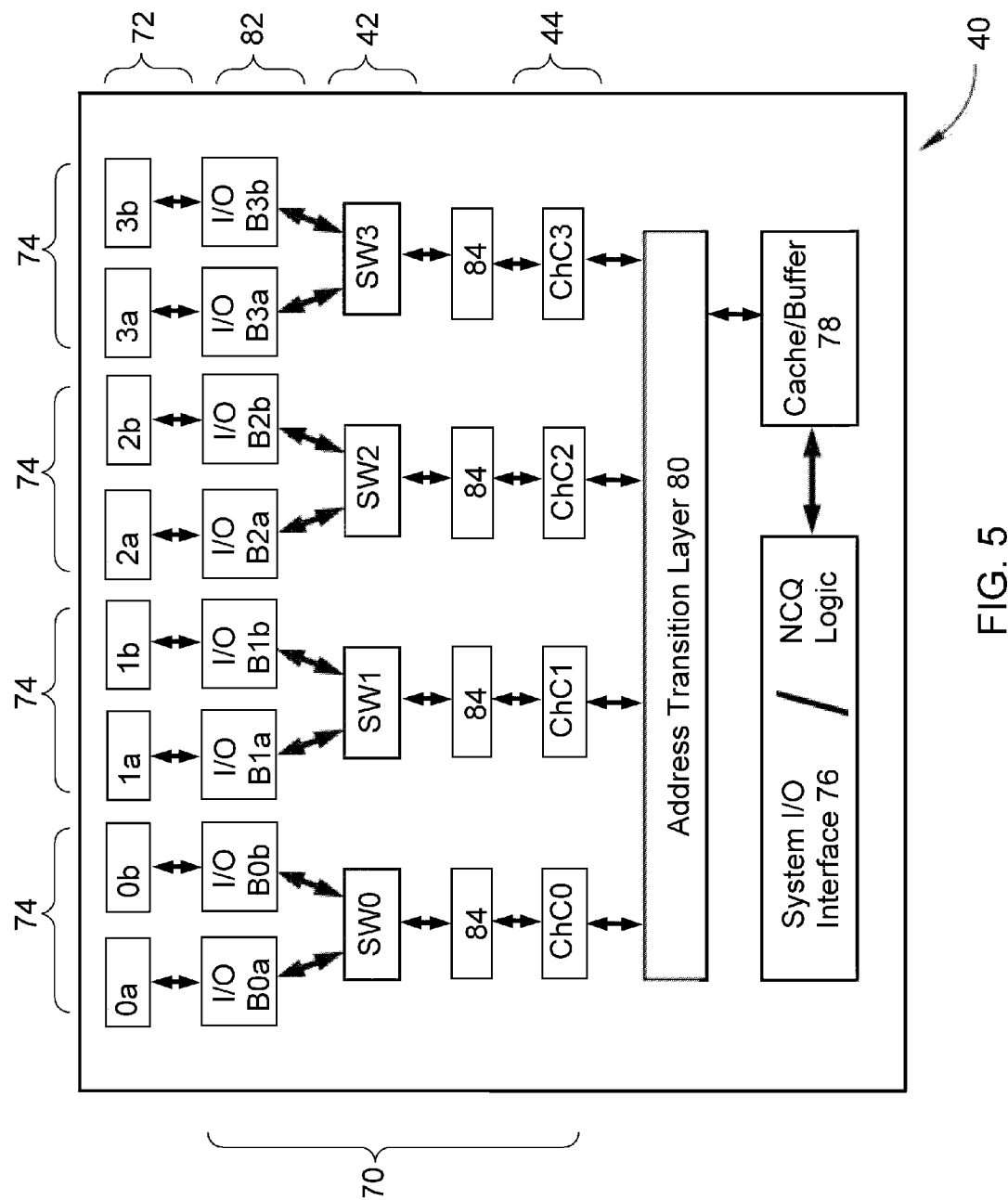
FIG. 5 shows a simplified schematic block diagram of an embodiment of the solid state drive controller of FIG. 4.

A more detailed schematic of an embodiment of the controller 40 of FIG. 4 is shown in FIG. 5 as a simplified block diagram, in which the controller 40 has a back-end interface 70 that includes the switching circuitry 42 comprising individual switches (SW0-SW3) or other suitable multiplexers/de-multiplexers. Each switch effectively doubles the I/O count relative to a corresponding number of channel control units 44 (ChC0-ChC3). Each switch is coupled to a pair of input/output (I/O) sets 72 (0a and 0b, 1a and 1b, 2a and 2b, or 3a and 3b). In combination, each switch and its corresponding channel control unit 44 and pair of I/O sets 72 define a channel 74 with the result that the back-end interface 70 comprises four channels 74 that are connected to separate multiplexed data buses (46 in FIG. 4), and each I/O set 72 defines a branch of its channel 74. The controller 40 further includes a system I/O interface 76 that communicates with the host system, queues up data requests, for example, through a native command queuing (NCQ) logic, and uses a buffer or cache 78 to perform write combining and prefetching of data on writes and reads. An address translation layer 80 translates virtual addresses into physical addresses that are then communicated through the channel control units 44 to the switches, the latter of which then split the data over their separate I/O sets 72 and data buses 46 to interface with the NAND flash memory devices 38 (FIG. 4). In combination, the controller 40 and its system I/O logic 76 (including NCQ logic), address translation layer 80, and back-end interface 70 make up the control logic for the solid state drive 30, and the components of the control logic are physically integrated into a control logic package mounted on the drive 30.

In view of shortcomings associated with the memory controller 40 using interleaved accesses of the same memory addresses on each bank 36 of memory devices 38, an additional implementation of this invention is to provide the capability of accessing each bank 36 through the use of independently generated addresses for each bank 36, and transferring the independent addresses with the switching circuitry 42 in a time-multiplexed manner. For example, individual addressing of the two banks 36 can be achieved with additional input/output (I/O) registers or buffers 82 (I/OB0a and 0b, I/OB1a and 1b, I/OB2a and 2b, or I/OB3a and 3b) associated with each of the banks 36 and independent addresses and channels 74 to the banks 36. In this implementation, the controller 40, which includes the address translation layer 80, generates the physical address for reads and writes from and to the memory devices 38 in a manner that can take into account wear leveling, command queuing, as well as the size of a data transfer. In the case of small data transfers, that is, 4 kB or 8 kB sets of data that match the size of a page or sub page, the data are not split over two banks 36 of the same channel 74, but instead can be buffered in the I/O buffer 82 associated with one I/O set 72 of the corresponding switch (SW0-SW3) of the switching circuitry 42, and the same channel 74 can be immediately thereafter be used to process the next request, which is then added to the same buffer 82 of the switch for write combining with the previously buffered data before committing them to the flash memory ICs.

Whether the memory controller 40 uses interleaving accesses of the same memory addresses on both banks 36 or accesses the banks 36 using independently generated addresses, if large sets of data are written to a channel 74, for example, during sequential writes, data can be distributed over the available channels 74 and then split with the switches onto the branches of each channel 74 as smaller chunks of data corresponding to the size of the I/O buffer 82 associated with each branch. For example, data could be written into a register or I/O buffer 84 between a channel control unit 44 and its associated switch of the switching circuitry 42, from where the upper half (or block) of the data is written to an upper branch of the channel 74 that contains an upper half of the I/O set 72 of the switch and the lower half (or block) of the data is written to a lower branch that contains a lower half of the I/O set 72 of the same switch, from where they are then forwarded to the memory banks 36 associated with each channel 74. As soon as the data are flushed from the I/O buffers 82, the switch forwards the next set of data whereby it toggles between the two branches of its channel 74. Similarly, on a read access, data from both I/O buffers 82 associated with a switch are transferred through the switch to the corresponding channel control unit 44 where they are either merged in the I/O buffer 84 or else forwarded in interleaved mode to the front end (76,78,80) of the controller 40 in a single clock cycle. Alternatively, instead of having a double wide interface from the channel control unit 44 to the switch, the interface may be the same width but run at twice the data rate.

While certain components are shown and preferred for the non-volatile memory device with multiple banks and bank switching circuitry for each NAND flash channel of this invention, it is foreseeable that functionally equivalent components could be used or subsequently developed to perform the intended functions of the disclosed components. Therefore, while the invention has been described in terms of a preferred embodiment, it is apparent that other forms could be adopted by one skilled in the art. Finally, while the appended claims recite certain aspects believed to be associated with the invention and indicated by the investigations discussed above, they do not necessarily serve as limitations to the scope of the invention.

The invention claimed is:

1. A non-volatile storage device for use with a host system, the storage device comprising:
a printed circuit board;
multiple banks of non-volatile solid-state memory devices on the printed circuit board;
a control logic integrated circuit on the printed circuit board, the control logic package comprising an input/output interface adapted to interface with a host bus adapter of the host system, a memory controller adapted to interface with the memory devices, and bank switching circuitry functionally interposed between the memory controller and each of the banks of the memory devices over separate address and data lines on a per bank basis so that each bank of the memory devices is individually coupled with the memory controller through the separate address and data lines dedicated thereto, the bank switching circuitry operating to switch accesses by the memory controller among the banks.

2. The non-volatile storage device of claim 1, wherein multiple channels of the memory devices are functionally arranged to define at least two of the banks of the memory devices per channel on the circuit board.

3. The non-volatile storage device of claim 2, wherein the banks interface with the memory controller using interleaved accesses of the same memory addresses on both of the two banks.

4. The non-volatile storage device of claim 2, wherein the two banks are accessed with independently generated addresses for each bank.

5. The non-volatile storage device of claim 2, wherein the bank switching circuitry comprises switches individually associated with each of the channels, the memory controller comprising:
first input/output buffers associated with each of the channels and disposed between the memory controller and one of the switches associated with the channel; and
pairs of upper and lower input/output buffers associated with each of the channels, the upper input/output buffer of each of the channels being disposed between the switch associated with the channel and one of the banks of the memory devices, and the lower input/output buffer of each of the channels being disposed between the switch associated with the channel and another of the banks of the memory devices;
wherein data written to the memory devices are written to the first input/output buffers and the switches are adapted to transfer an upper block of the data in the first input/output buffer to the upper input/output buffer and transfer a lower block of the data in the first input/output buffer to the lower input/output buffer, and wherein data read from the memory devices are read into the upper and the lower input/output buffers and then combined by the switches in the first input/output buffer before being transferred to the memory controller in a single clock cycle.

6. The non-volatile memory device of claim 2, wherein the bank switching circuitry comprises switches individually associated with each of the channels, the storage device further comprising:
channel control units individually associated with each of the channels; and
pairs of first and second input/output buffers associated with each of the channels, the first input/output buffer of each of the channels being disposed between the switch associated with the channel and one of the banks of the memory devices, and the second input/output buffer of each of the channels being disposed between the switch associated with the channel and another of the banks of the memory devices;
wherein a first set of data written to the memory devices is transferred from the channel control units via the switches associated with the channels thereof to the first input/output buffer and a second set of data written to the memory devices is transferred via the switches associated with the channels thereof to the second input/output buffer, and the data transfer frequency from the channel control units to the switches is twice that of each of the first and second input/output buffers to the memory devices.

7. A method of increasing addressable memory space of a non-volatile storage device comprising a circuit board and control logic and non-volatile solid-state memory devices on the circuit board, the method comprising:

providing multiple channels of the memory devices that are functionally arranged to define at least two banks of the memory devices per channel on the circuit board;

providing the control logic to comprise system interface logic, a memory controller and channel control units integrated in a single integrated circuit package;

providing bank switching circuitry associated with each channel and integrated on the single integrated circuit package, the bank switching circuitry being functionally interposed between the memory controller and each of the banks of the memory devices over separate address and data lines on a per bank basis so that each bank of the memory devices is individually coupled with the memory controller through the separate address and data lines dedicated thereto; and operating the bank switching circuitry to multiply memory space within the memory devices that is addressable by each channel by the number of the at least two banks.

8. The method of claim 7, wherein the banks of the memory devices interface with the memory controller using interleaved accesses of the same memory addresses on the banks.

9. The method of claim 7, wherein the banks of the memory devices are accessed with independently generated addresses for each bank.

10. The method of claim 7, wherein the bank switching circuitry comprises switches individually associated with each of the channels, the storage device further comprises first input/output buffers associated with each of the channels and disposed between the memory controller and one of the switches associated with the channel, and the storage device further comprises pairs of upper and lower input/output buffers associated with each of the channels, the upper input/output buffer of each of the channels being disposed between the switch associated with the channel and one of the banks of the memory devices, and the lower input/output buffer of each of the channels being disposed between the switch associated with the channel and another of the banks of the memory devices, the method further comprising:

writing data to the memory devices by writing the data to the first input/output buffers and operating the switches to transfer an upper block of the data in the first input/output buffer to the upper input/output buffer and transfer a lower block of the data in the first input/output buffer to the lower input/output buffer; and reading data from the memory devices by reading the data into the upper and the lower input/output buffers and then operating the switches to combine the data in the first input/output buffer before transferring the data to the memory controller in a single clock cycle.

11. The method of claim 7 wherein the bank switching circuitry comprises switches individually associated with each of the channels, the storage device further comprises channel control units individually associated with each of the channels and the storage device further comprises pairs of first and second input/output buffers associated with each of the channels, the first input/output buffer of each of the channels being disposed between the switch associated with the channel and one of the banks of the memory devices, and the second input/output buffer of each of the channels being disposed between the switch associated with the channel and another of the banks of the memory devices, the method further comprising:

writing a first set of data to the memory devices by operating the switches to transfer the data from the channel control units associated with the channels thereof to the first input/output buffer; and writing a second set of data to the memory devices by operating the switches to transfer the data from the control units associated with the channels thereof to the second input/output buffer;

wherein the data transfer frequency from the channel control units to the switches is twice that of each of the first and second input/output buffers to the memory devices.

12. The method of claim 7 wherein the memory devices are chosen from the group consisting of NAND flash memory, phase-change memory, magnetic RAM, resistive memory and FRAM.

13. A monolithic control logic for a solid state drive adapted to interface non-volatile memory devices with a host system, the monolithic control logic comprising:

a system interface including circuitry for native command queuing;

an address translation layer adapted to translate virtual addresses into physical memory addresses;

at least two channels for accessing the memory devices, and input/output pins adapted to interface with at least two banks of the memory devices, each of the channels having a channel control unit; and switching circuitry interposed between the channel control unit and the input/output pins of the monolithic control logic and comprising switches functionally interposed between the memory controller and each of the banks of the memory devices over separate address and data lines on a per bank basis so that each bank of the memory devices is individually coupled with the memory controller through the separate address and data lines dedicated thereto, the switching circuitry being operable to switch access by the channel control units from one of the banks of the memory devices to another bank of the memory devices.

14. The monolithic control logic of claim 13, wherein each of the channels has a data rate between the channel control unit and the switch thereof that is twice as high as that between the switch and the input output pins thereof.

15. The monolithic control logic of claim 13, wherein the banks of the memory devices are accessed by the channel control units via the switching circuitry in an interleaved manner at the same respective physical address on each bank.

16. The monolithic control logic of claim 13, wherein the banks of the memory devices receive independent addresses that are transferred from the channel control units to the switches in a time-multiplexed manner.

* * * * *